(12) United States Patent
Kobsa

(10) Patent No.: US 6,195,245 B1
(45) Date of Patent: Feb. 27, 2001

(54) LOW CAPACITANCE SURGE PROTECTOR FOR HIGH SPEED DATA TRANSMISSION

(75) Inventor: Peter Kobsa, Floral Park, NY (US)

(73) Assignee: Porta Systems Corp., Syosset, NY (US)

( * ) Notice: Under 35 U.S.C. 154(b), the term of this patent shall be extended for 0 days.

(21) Appl. No.: 09/321,989

(22) Filed: May 28, 1999

Related U.S. Application Data

(60) Provisional application No. 60/087,323, filed on May 29, 1998.

(51) Int. Cl.[7] ....................................... H02H 1/00
(52) U.S. Cl. .......................... 361/120; 361/119; 361/91.5
(58) Field of Search .................... 361/111, 56, 91.1, 361/91.5, 117–120; 379/412

(56) References Cited

U.S. PATENT DOCUMENTS

| | | |
|---|---|---|
| 3,840,781 | 10/1974 | Brown . |
| 4,023,071 | 5/1977 | Fussell . |
| 4,254,442 | 3/1981 | Dijkmans et al. . |
| 4,544,983 | 10/1985 | Anderson et al. . |
| 4,683,514 | 7/1987 | Cook . |
| 4,695,916 * | 9/1987 | Satoh et al. .............................. 361/56 |
| 4,941,063 * | 7/1990 | McCartney et al. ................... 361/119 |
| 4,964,160 * | 10/1990 | Traube et al. ......................... 379/412 |
| 5,608,311 | 3/1997 | Innes et al. . |
| 5,623,388 * | 4/1997 | Chaudhry .............................. 361/119 |
| 5,706,160 * | 1/1998 | Latuszkin et al. .................... 361/119 |
| 5,712,755 | 1/1998 | Glaser et al. . |
| 5,790,363 * | 8/1998 | Chaudhry .............................. 361/119 |
| 5,808,849 * | 9/1998 | Storbeck .............................. 361/119 |
| 5,841,620 * | 11/1998 | Masghati .............................. 361/119 |
| 6,072,683 * | 6/2000 | Masghati .............................. 361/119 |

* cited by examiner

Primary Examiner—Michael J. Sherry
(74) Attorney, Agent, or Firm—Hoffmann & Baron, LLP

(57) ABSTRACT

A surge protector circuit and method of protecting electronic equipment which do not load down a circuit at high frequencies and do not degrade a signal in high speed data transmission. A gas tube is connected in parallel with low capacitance diodes and an avalanche semiconductor device, such as a TVS. The diodes and the avalanche semiconductor clamp the voltage transient and allow the slower gas tube more time to fire, discharging the surge. The addition of the low capacitance diodes in series with the avalanche semiconductor, reduces the line-to-line and line-to-ground capacitances of the surge protector and keeps the surge protector circuit from loading down the rest of the circuit and degrading the signal.

11 Claims, 15 Drawing Sheets

LOW CAPACITANCE SURGE PROTECTOR FOR HIGH SPEED DATA TRANSMISSION

This application claims the benefit of United States provisional patent application Ser. No. 60/087,323, filed May 29, 1998, entitled "Low Capacitance Surge Protector for High Speed Data Transmission," the disclosure of which is incorporated herein by reference.

BACKGROUND OF THE INVENTION

1. Field of the Invention

This invention relates to methods and apparatus for suppressing transient voltages and current spikes on high speed transmission lines for the purpose of protecting electronic equipment.

2. Description of the Prior Art

Prior art systems for protecting electrical equipment from the damaging effects of voltage transients and current spikes associated with energy surges are well known. Such systems have included the use of gas dissipating tubes, semiconductor devices, or some combination thereof.

Gas dissipating tubes, or spark gaps, dissipate energy by producing an electrical arcing to ground. This arcing occurs through the ionization of a gas of known dielectric strength during an electrical surge condition.

While gas dissipating tubes provide sufficient suppression for most energy surges, their relatively slow response time results in a failure to suppress fast rise time voltage transients and current spikes. Such transients and spikes are capable of destroying electrical equipment connected to the electrical line upon which the voltage transients and current spikes are induced.

FIG. 1 shows a conventional surge protector which employs a gas dissipating tube 2 connected between two electrical transmission lines 4, 6, which lines carry signals to electronic equipment, such as computer or telephony equipment, connected thereto. In telephone systems, transmission lines 4, 6 may be a tip and ring line, respectively.

FIG. 3 is a graph of voltage from one electrical line 4, 6 to ground versus time after a first pulse is introduced to one electrical line 4, of the circuit in FIG. 1. The first pulse ramps up to its maximum voltage of 5 kV (kilovolts) in 10 μs (microseconds) and decays to one-half the maximum voltage in 700 μs. This first pulse will be referred to as a 10/700 pulse.

As the first pulse ramps up, the voltage across the gas tube increases. As a result, the gas tube begins to charge. When the gas tube is fully charged, the gas in the is gas tube will ionize and the pulse will be dissipated. In FIG. 3, the gas is shown to have ionized at 298V. The ionization occurred 2.6 μs after the pulse was introduced.

FIG. 4 is a graph of voltage from one electrical line 4, 6 to ground versus time after a second pulse was introduced to one electrical line 4, 6 of the circuit in FIG. 1. The second pulse ramps up to its maximum voltage of 4 kV in 5 ns (nanoseconds) and decays to one-half the maximum voltage in 50 ns. This second pulse will be referred to as a 5/50 pulse.

The circuit operates in the same manner as when the 10/700 pulse was introduced. Since the 5/50 pulse has a faster rise time than the 10/700 pulse, however, the voltage spikes up to 2.96 kV before the gas in the gas tube ionizes. Moreover, after firing, the gas tube does not clamp the voltage low enough to protect the electronic equipment. The voltage rises to above 1 kV several times during the duration of the 5/50 pulse and only begins to drop off after the pulse has finished.

The response time of semiconductor-type surge suppressors is faster than that of gas dissipating tubes. The typical avalanche semiconductor device used, however, is limited in the level of energy which it can dissipate before being destroyed by the electrical surge. Further, these devices add significant levels of capacitance to the surge protection circuit. Typical gas tubes have capacitances of between about 2 pF (picofarads) and about 7 pF. The semiconductor circuits used in conjunction with the gas tubes, however, increase the capacitance of the conventional surge protector circuit to about 100 pF. The problem with such relatively high capacitance is that it limits the bandwidth and, therefore, the signal transmission rate of the transmission line to which the surge protector is connected.

Examples of such prior art designs include arrangements of gas dissipating tubes in combination with Zener diodes or some other semiconductor device with similar clamping characteristics. Typically, these circuits include additional elements which introduce added capacitance or inductance to the circuit.

Another conventional surge protector is shown in FIG. 2. It includes a gas dissipating tube 2 connected across electrical lines 4, 6 and two avalanche semiconductors. One avalanche semiconductor 8 is connected between electrical line 4 and ground and the other avalanche semiconductor 10 is connected between electrical line 6 and ground.

FIG. 5 is a graph of voltage from one electrical line 4, 6 to ground versus time after a 10/700 pulse is introduced to one electrical line 4, 6 of the circuit in FIG. 2.

As the 10/700 pulse ramps up, the voltage across the gas tube increases. As a result, the gas tube begins to charge. When the voltage across the gas tube reaches the breakdown voltage of the avalanche semiconductor, the avalanche semiconductor sinks current and clamps the voltage across the gas tube at the avalanche semiconductor's breakdown voltage, thereby, protecting the attached electronic equipment.

In FIG. 5, the avalanche semiconductor began sinking current when the voltage across the gas tube reached 222V. The 222V level was reached 2 μs after the 10/700 pulse was introduced to the electrical line. The voltage across the gas tube is then clamped at 222V by the avalanche semiconductor. After the avalanche semiconductor clamps the voltage, the gas tube will continue to charge until the gas in the gas tube ionizes and dissipates the pulse. FIG. 5 shows the gas ionized 3.2 μs after the pulse was introduced on the line.

FIG. 6 is a graph of voltage from one electrical line 4, 6 to ground versus time after a 5/50 pulse is introduced to either electrical line 4, 6 of the circuit in FIG. 2. The circuit operates in the same manner as when the 10/700 pulse was introduced. The faster rise time of the 5/50 pulse, however, results in a voltage spike of 360V before the avalanche semiconductor begins clamping the voltage. Once the avalanche semiconductor starts to sink current and clamp the voltage, the voltage drops to less than 250V within 22 ns of the pulse being introduced to the line.

A further example of a surge protector is disclosed in U.S. Pat. No. 4,683,514 to Cook. The Cook patent discloses the use of a spark gap disposed across an electrical line and in parallel with an avalanche semiconductor device. An energy surge induced on the electrical line will cause the semiconductor circuit to clamp the transient at the breakdown voltage of the semiconductor device and will cause the spark gap to fire within a specified time period. The addition of the avalanche semiconductor device adds a significant capacitance to the electrical line, thus degrading higher frequency signals carried by the line.

OBJECTS AND SUMMARY OF THE INVENTION

It is an object of the present invention to provide an improved electrical line surge protector which can be used to protect electronic equipment from energy surges including normal and fast rise time voltage transients and current spikes induced by lightning and electromagnetic pulses without loading down the circuit with increased capacitance.

It is a further object of the present invention to provide a surge protector with nearly identical levels of capacitance from line-to-line and line-to-ground in a balanced circuit arrangement.

It is an even further object of the present invention to provide a method of reducing the capacitance of a surge protector to enable electronic equipment to be protected and at the same time allow high speed data transmission.

The low capacitance surge protector is comprised of a gas tube, a first avalanche semiconductor, and at least a first parallel arrangement of diodes connected in series with the first avalanche semiconductor. The at least first parallel arrangement of diodes and first avalanche semiconductor forming a first series arrangement of components. The first series arrangement is connected between a first conductor (e.g., a tip line in a telephone system) and ground. The at least first parallel arrangement of diodes includes at least one pair of diodes. The diodes of the at least one pair of diodes are coupled together in opposite polarity.

A second embodiment includes at least a second parallel arrangement of diodes (connected in opposite polarity to each other) connected in series with a second avalanche semiconductor. The at least second parallel arrangement of diodes and second avalanche semiconductor forming a second series arrangement of components. The second series arrangement of componenets is connected between ground and a second conductor (e.g., a ring line in a telephone system).

The parallel arrangements of diodes are placed in series with the avalanche semiconductors to effectively reduce the overall capacitance of the surge protector measured from line-to-line or from line-to-ground.

In a third embodiment each one of the first series arrangement of components and second series arrangement of components includes two parallel arrangements of diodes (the diodes in each parallel arrangement being connected in opposite polarity) in series with each of the avalanche semiconductors. The additional parallel arrangments of diodes further reduce the capacitance of the surge protector from line-to-line and line-to-ground.

In a preferred embodiment, a three element gas tube includes a first element, a second element, and a ground element. The first element is connected to the line 4, the second element is connected to the line 6, and the ground element is connected to ground. A first pair of diodes which are interconnected in series cathode to cathode are connected between the line 4 and the line 6. A second pair of diodes which are interconnected in series anode to anode are connected between the line 4 and the line 6. The interconnected cathodes of the first series arrangement of diodes is connected to one end of a first avalanche semiconductor, whose other end is connected to the anode of a fifth diode. The cathode of the fifth diode is grounded. Alternatively, the interconnected cathodes may be connected to the anode of the fifth diode, whose cathode is connected to one end of the first avalanche semiconductor, which in this case, the second end of the first avalanche semiconductor is grounded. The interconnected anodes of the second series arrangement of diodes is connected to one end of a second avalanche semiconductor, whose other end is connected to the cathode of a sixth diode. The anode of the sixth diode is grounded. Alternatively, the interconnected anodes may be connected to the cathode of the sixth diode, whose anode is connected to one end of the second avalanche semiconductor, which in this case, the second end of the second avalanche semiconductor is grounded.

The present invention also includes a method of reducing the capacitance of a surge protector circuit having a gas discharge tube and an avalanche semiconductor coupled in parallel with the gas discharge tube. The gas discharge tube and avalanche semiconductor are electrically coupled between an electrical line and ground. The avalanche semiconductor is electrically connected in series with at least one parallel arrangement of diodes. Each parallel arrangement of diodes includes a pair of diodes which are coupled in opposite polarity to each other. The pair of diodes have a total capacitance associated therewith. The avalanche semiconductor also has a capacitance associated therewith. The parallel arrangement of diodes and the avalanche semiconductor are electrically coupled in series which causes the total capacitance of the parallel arrangement of diodes and capacitance of the avalanche semiconductor to combine in series. The result is a reduced total capacitance of the surge protector between the electrical line and ground. Preferably, each of the diodes of the pair of diodes in the method of reducing the capacitance of a protection circuit are fast recovery diodes. A similar arrangement of diodes and an avalanche semiconductor can be coupled between a second electrical line and ground to reduce the capacitance of the protection circuit between the second electrical line and ground.

These and other objects, features, and advantages of the present invention will be apparent from the following detailed description of illustrative embodiments thereof, which are to be read in connection with the accompanying drawings.

DETAILED DESCRIPTION OF THE PREFERRED EMBODIMENTS

Figure 7:
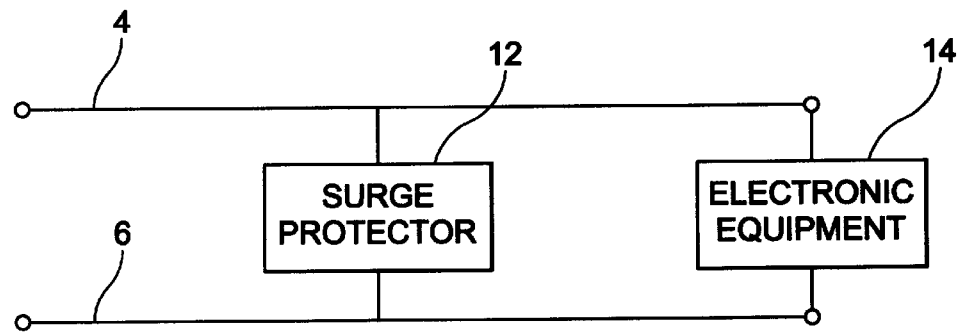
FIG. 7 is a functional block diagram of a surge protector formed in accordance with the present invention.

Referring initially to FIG. 7, a block diagram of a surge protector is shown illustrating the functional relationship of the protector's various components. Electrical lines 4, 6 may be any type of electrical line to which electronic equipment may be connected, for example, a telephone system's tip or ring line. In a preferred embodiment, the surge protector 12 is connected across a telephone line including a tip line and/or a ring line. A more detailed block diagram of the surge protection system is shown in FIG. 8.

Figure 8:
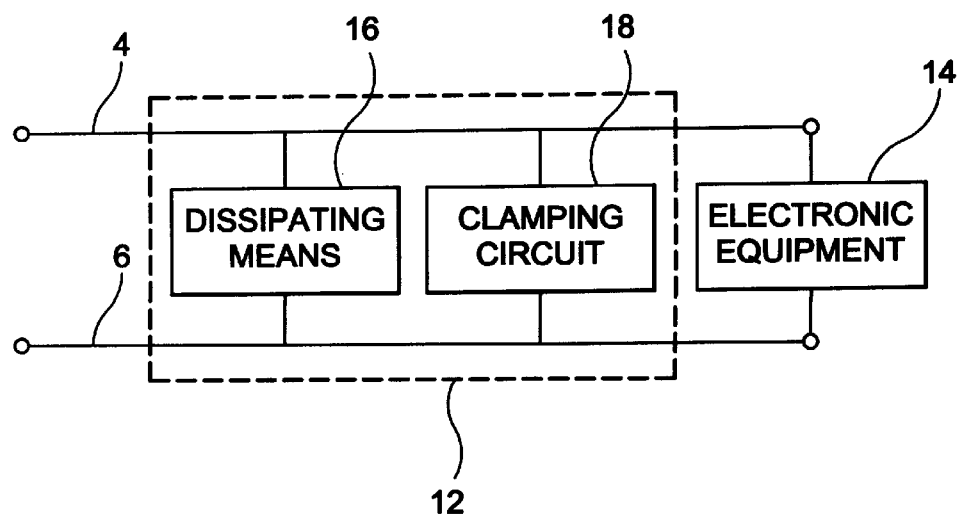
FIG. 8 is a functional block diagram of a surge protector formed in accordance with the present invention which illustrates the internal blocks of a surge protector.

As shown in FIG. 8, the surge protector 12 comprises a clamping circuit 18 and an energy dissipating means 16. Electronic equipment 14 is the equipment connected to the electrical line which the invention serves to protect from energy surges. Electronic equipment 14 may be any type of electronic equipment, including telecommunications electronics, computers, or instrumentation. The functionality of these individual system components will now be described in the context of a specific embodiment of the present invention.

Figure 9:
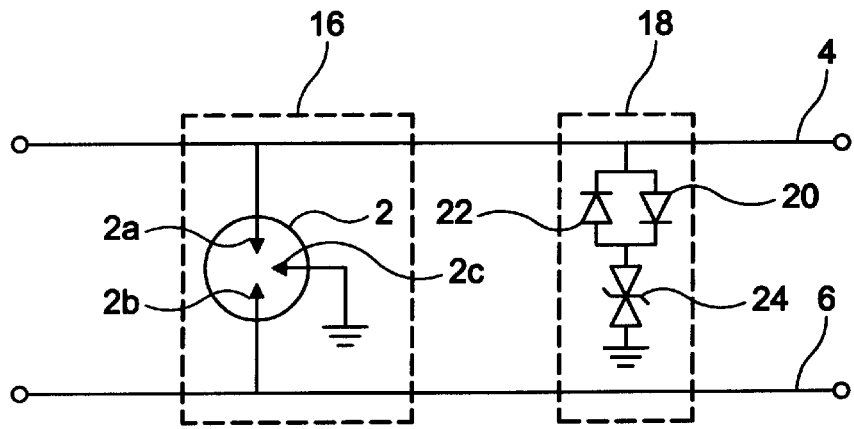
FIG. 9 is a schematic diagram of one embodiment of a surge protector formed in accordance with the present invention.

A specific embodiment of a surge protector formed in accordance with the present invention is illustrated in the schematic diagram of FIG. 9. It is to be understood that electrical line 4, 6 in a preferred embodiment may either be a telephone tip line or ring line. The dissipating means 16 described previously in connection with the block diagram of FIG. 8 may include a gas dissipating tube 2. Gas dissipating tube 2 includes a first electrode 2a connected to one electrical line 4, 6, a second electrode 2b connected to the other electrical line 4, 6, and a third electrode 2c connected to ground. Ground may be a ground line or a ground tie point.

The clamping circuit 18 described previously in connection with the block diagram of FIG. 8 is shown in the embodiment of FIG. 9 as including a pair of low capacitance, fast recovery diodes 20, 22 which are connected in parallel and in opposite polarity to each other. The parallel arrangement of diodes 20, 22 is connected to one of electrical lines 4 or 6. The clamping circuit 18 further includes a bidirectional avalanche semiconductor 24, such as a TVS, which is connected between the parallel arrangement of diodes 20, 22 and ground.

The surge protection system suppresses energy on electrical line 4, 6 in the following manner. Assume an energy surge occurs on electrical line 4 or 6. The source of the surge may be either lightning or an electromagnetic pulse, inducing normal or fast rise time voltage transients or current spikes on the line. The surge may be on the order of a 4 kV (kilovolt) fast transient burst pulse with a 5/50 ns (nanosecond) waveshape (i.e., the pulse will ramp up to its maximum voltage of 4 kV in 5 ns and decay to one-half its peak voltage in 50 ns). The surge may also have an impulse discharge current of 5 kA (kiloampere) with an 8/20 $\mu$s (microsecond) waveshape (i.e., the pulse will ramp up to its maximum current of 5 kA in 8 $\mu$s and decay to one-half its peak current in 20 $\mu$s). It is to be appreciated that these surge characteristics are not intended to be maximum suppression limits of the surge protector; rather, they are merely illustrative of the magnitude of the surge that the system is ordinarily capable of handling.

As the voltage of the transient pulse begins to increase, the avalanche semiconductor 24 will reach its breakdown voltage, causing the transient to be clamped at the breakdown voltage within nanoseconds. The breakdown voltage will be at a safe level for the attached electronic equipment 14. The slower gas tube 2 will then have time to react to the pulse and discharge the transient before the elements of the clamping circuit 18 or electrical equipment 14 are damaged. The purpose of connecting the parallel arrangement of diodes 20, 22 in series with avalanche semiconductor 24 is to reduce the overall capacitance of the surge protector between the electrical lines 4, 6 and ground, yet still provide the electronic equipment connected to the electrical lines 4, 6 with surge protection which includes the high current shunting capability of the gas discharge tube 2 and the fast reaction time to transients afforded by the avalanche semiconductor 24.

The parallel capacitance of diodes 20, 22 sum in series with the capacitance of the avalanche semiconductor 24 in accordance with the equation:

$$C_T = \frac{C_P \times C_A}{C_P + C_A} \qquad \text{Eq. 1}$$

where $C_T$ is the capacitance of the clamping circuit 18 between the electrical lines 4, 6 and ground, $C_P$ is the capacitance of the parallel arrangement of diodes 20, 22, and $C_A$ is the capacitance of avalanche semiconductor 24.

A preferred circuit, as shown in FIG. 9, uses as a gas discharge tube 2, Part No. T22-C200X manufactured by Siemens Components, Inc. of Iselin, N.J., having an approximate capacitance of 2–5 pF; as diodes 20, 22, Part No. 50-400-40 manufactured by Sussex Semiconductor of Fort Meyers, Fla., each having a capacitance of approximately 10–15 pF; and as avalanche semiconductor 24, a TVS, Part No. SZZ-16-1-200-250-10ULC manufactured by Sussex Semiconductor of Fort Meyers, Fla., having a capacitance of approximately 80 pF. With these components, the circuit of FIG. 9 has a line-to-ground (i.e., between electrical line 4 or 6 and ground) capacitance of about 40 pF, and a line-to-line (i.e., between electrical lines 4 and 6) capacitance of between about 20 pF and about 22 pF.

Although a three-element gas tube is described in the embodiment of FIG. 9, a two-element gas tube may also be implemented with this embodiment. The two-element gas tube and the clamping circuit are connected in parallel between an electrical line 4, 6 and ground or between electrical lines 4, 6. The circuit operates in the same manner as the circuit in FIG. 9, except that there is no surge protection for the line which is not connected to the gas tube.

A parallel arrangement of fast recovery diodes 20, 22 in an opposite polarity configuration is used so as to allow the surge protector to operate bidirectionally, i.e., the transient pulse may come from ground or from electrical line 4, 6. In either case, the surge protector will still operate to protect the equipment connected to it.

Figure 10:
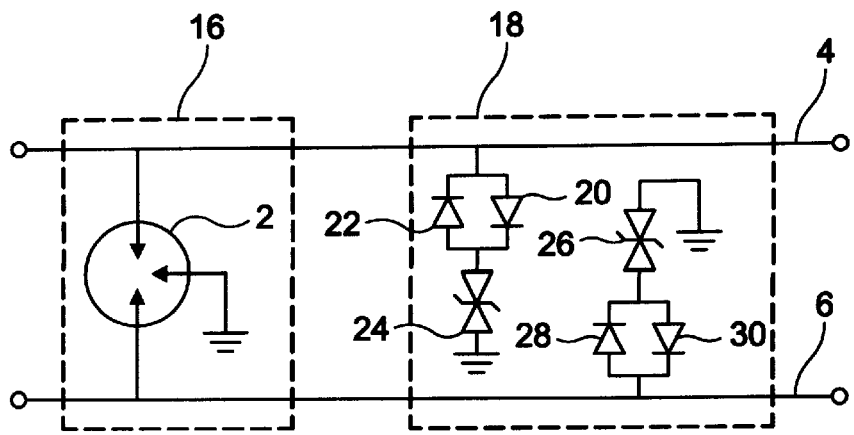
FIG. 10 is a schematic diagram of a second embodiment of a surge protector formed in accordance with the present invention.

The circuit shown in FIG. 10 is similar in many respects to the circuit shown in FIG. 9. The surge protector includes a gas discharge tube 2 and a parallel arrangement of fast recovery diodes 20, 22 connected in series with an avalanche semiconductor 24, each of which is connected together and to lines 4 or 6 as described previously and shown in FIG. 9. The circuit shown in FIG. 10, however, includes an additional parallel arrangement of fast recovery diodes 28, 30 connected in an opposite polarity configuration and another avalanche semiconductor 26 connected in series with the additional parallel arrangement of diodes, as part of the clamping circuit 18. The first series arrangement of diodes 20, 22 and avalanche semiconductor 24 is connected between the electrical line 4 and ground and the second series arrangement of diodes 28, 30 and avalanche semiconductor 26 is connected between the electrical line 6 and ground. The particular configuration of this circuit provides surge protection to the electrical equipment connected to lines 4, 6 whether the surge comes from line 4, line 6, or ground.

Using the same preferred components as described with respect to the embodiment shown in FIG. 9, the surge protector shown in FIG. 10 will exhibit a line-to-ground capacitance of about 40 pF, and a line-to-line capacitance of between about 16 pF and about 18 pF.

Figure 13:
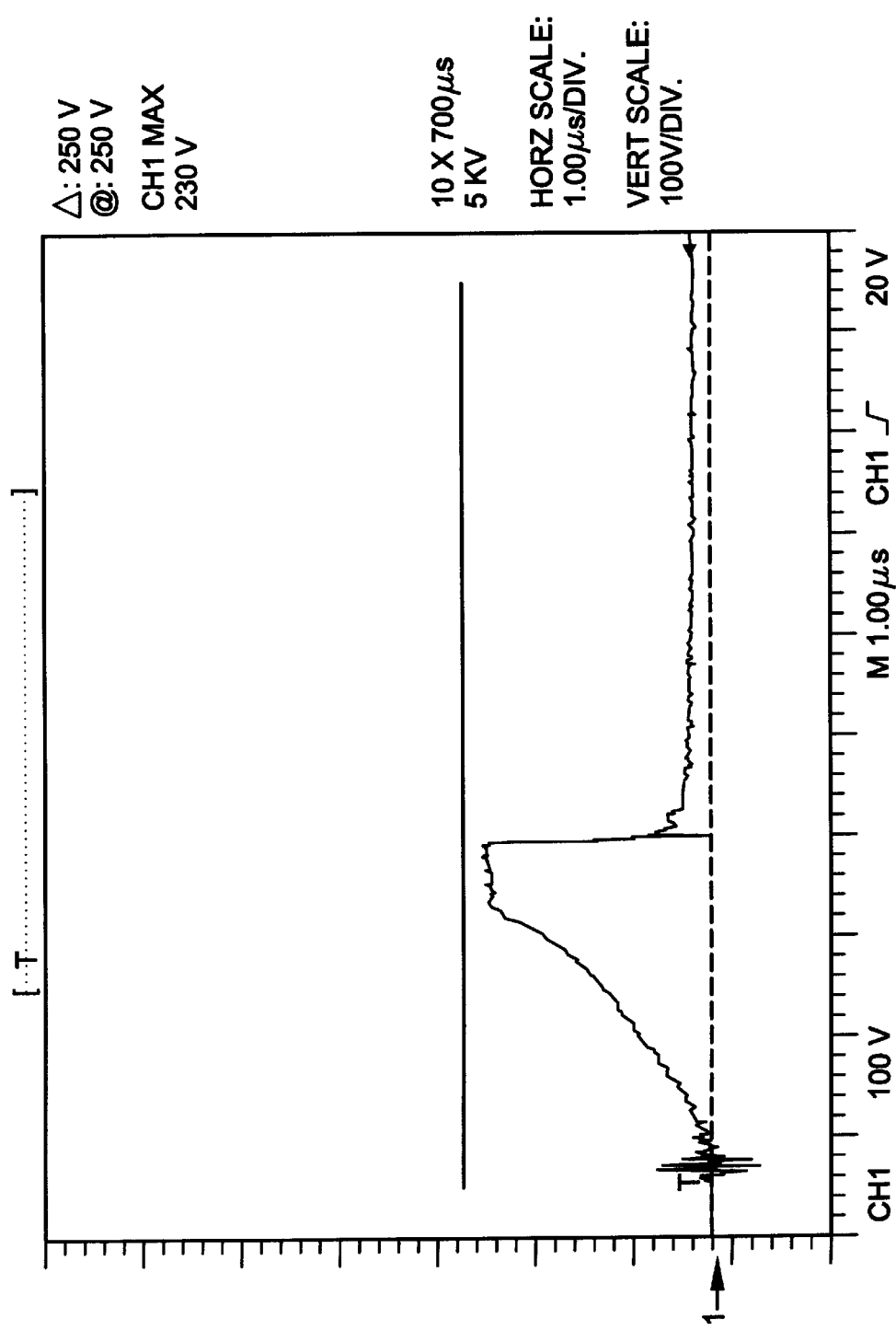
FIG. 13 is a graph of voltage versus time illustrating the voltage across the gas dissipating tube in the circuit of FIG. 10 after a 10/700 pulse is introduced onto either electrical line.

FIG. 13 depicts a graph of voltage from one electrical line 4, 6 to ground versus time after a 10/700 pulse is introduced to one electrical line 4, 6 of the circuit in FIG. 10.

As the pulse ramps up, the voltage across the gas tube increases. As a result, the gas tube begins to charge. When the voltage across the gas tube reaches the breakdown voltage of the avalanche semiconductor plus the turn on voltage of the diode, the avalanche semiconductor sinks current and clamps the voltage across the gas tube at the sum of the avalanche semiconductor's breakdown voltage and the voltage across a forward biased diode.

In FIG. 13, the avalanche semiconductor begins sinking current when the voltage across the gas tube reaches 230V. The 230V level is reached 2.2 µs after the 10/700 pulse is introduced to the electrical line. The voltage across the gas tube is then clamped at 230V until the gas in the gas tube ionizes and dissipates the pulse. FIG. 13 shows the gas ionizes 3 µs after the pulse is introduced on the line.

Figure 6:
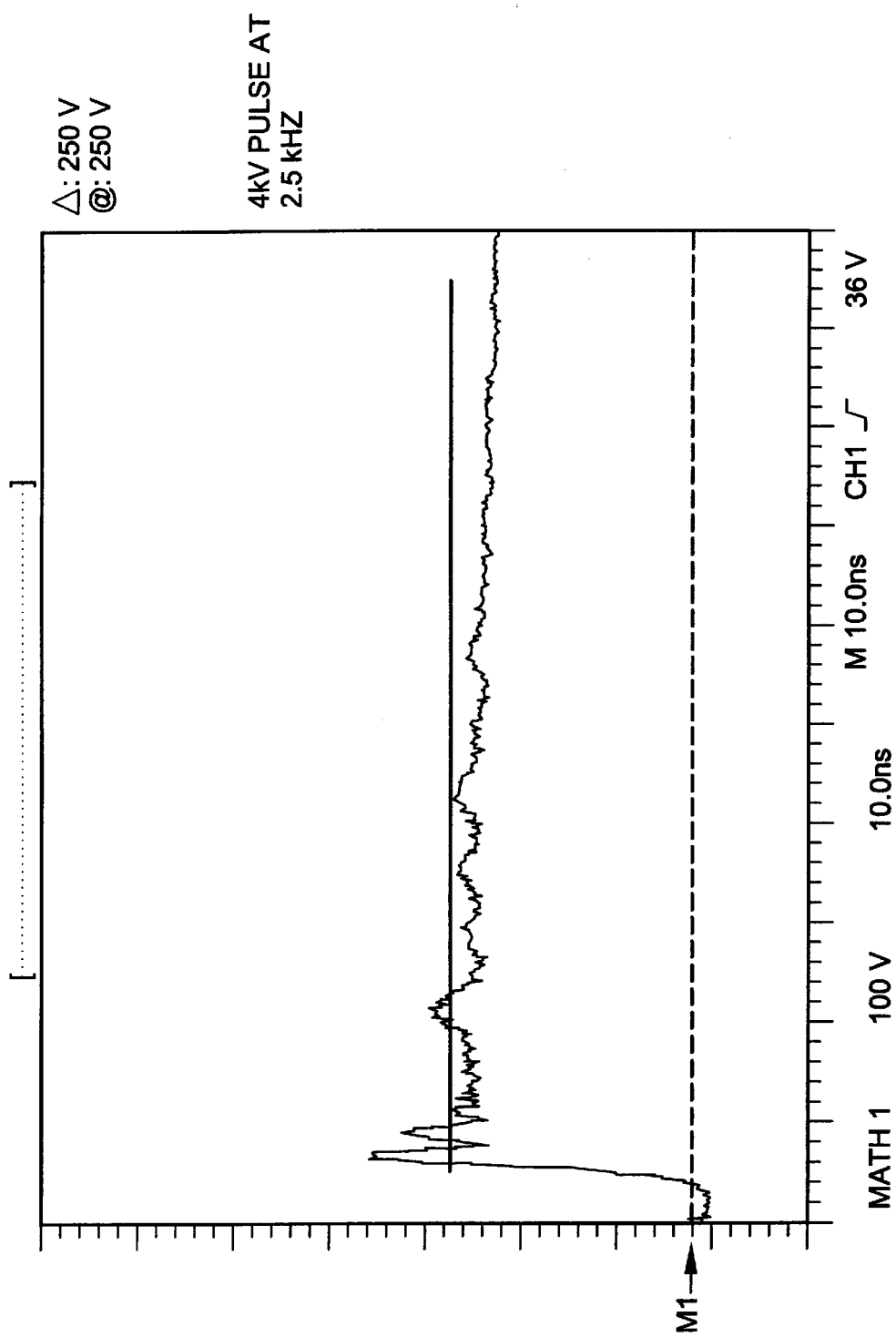
FIG. 6 is a graph of voltage versus time illustrating the voltage across the gas dissipating tube in the circuit of FIG. 2 after a 5/50 pulse is introduced onto either electrical line.
Figure 14:
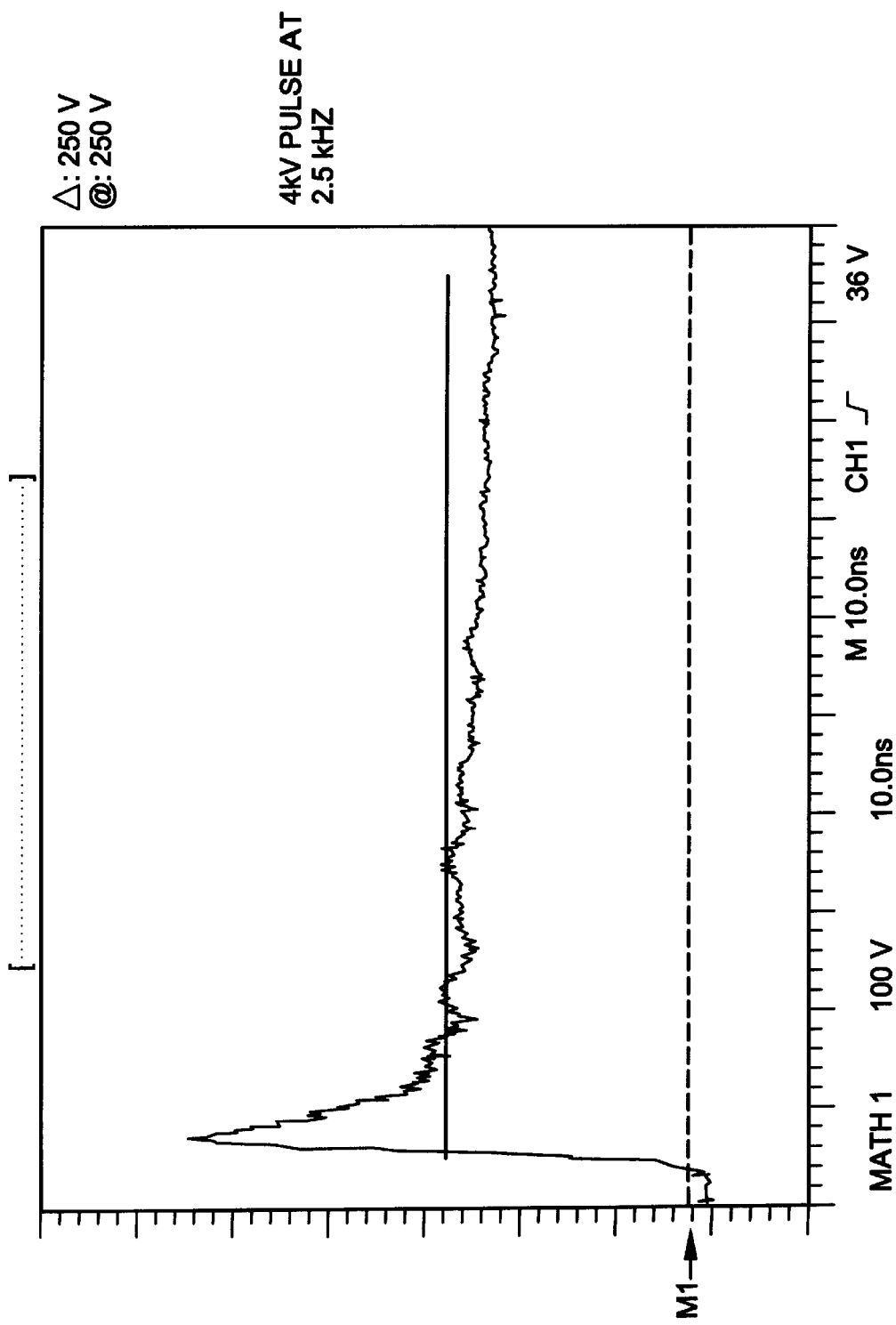
FIG. 14 is a graph of voltage versus time illustrating the voltage across the gas dissipating tube in the circuit of FIG. 10 after a 5/50 pulse is introduced onto either electrical line.

FIG. 14 is a graph of voltage from one electrical line 4, 6 to ground versus time after a 5/50 pulse is introduced to one electrical line 4, 6 of the circuit in FIG. 10. The circuit operates in the same manner as when the 10/700 pulse is introduced. As in FIG. 6, however, the faster 5/50 pulse is shown to cause a voltage spike of 530V before the diode turns on and the avalanche semiconductor begins sinking current. After the avalanche semiconductor begins sinking current, the voltage drops below 250V.

Additional parallel arrangements of fast recovery diodes in an opposite polarity configuration can be added in series with the diodes 20, 22 and avalanche semiconductor 24 or in series with diodes 28, 30 and avalanche semiconductor 26.

Figure 11:
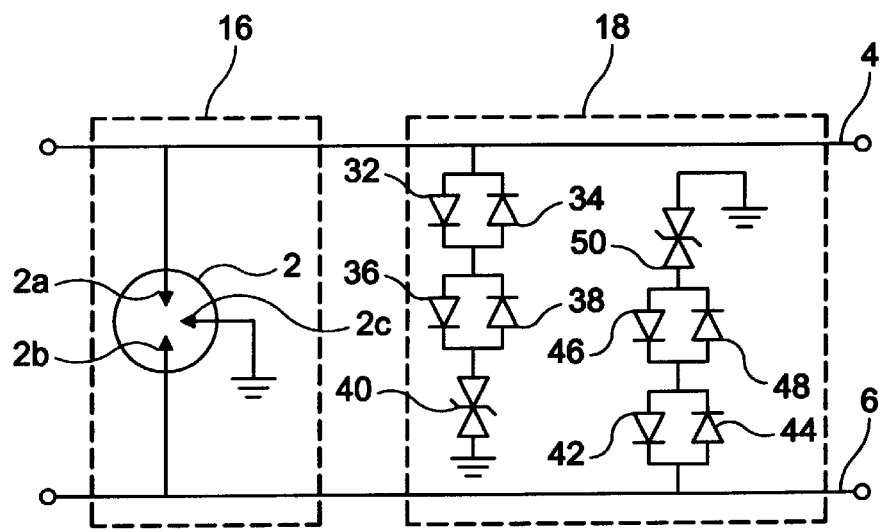
FIG. 11 is a schematic diagram of a third embodiment of a surge protector formed in accordance with the present invention.

FIG. 11 is a schematic diagram of a circuit similar to the circuit illustrated in FIG. 10 but with additional parallel arrangements of diodes. In FIG. 11, a three-element gas tube 2 includes a first element 2a connected to electrical line 4, a second element 2b connected to electrical line 6, and a third element 2c connected to ground. Two parallel arrangements of diodes (connected in opposite polarity) are connected in series, and this series arrangement of diodes is connected to an avalanche semiconductor 40. Together, the series arrangement of diodes and the avalanche semiconductor are connected between electrical line 4 and ground. Similarly, two other parallel arrangements of diodes (connected in opposite polarity) arc connected in series and this second series arrangement of diodes is connected to a second avalanche semiconductor 50. This second series arrangement of diodes and the second avalanche semiconductor 50 are connected between electrical line 6 and ground.

The capacitance of each series arrangement including two parallel arrangements of diodes in opposite polarity configurations and an avalanche semiconductor is calculated in accordance with the following equation:

$$C_T' = \frac{1}{\frac{1}{C_{P1}} + \frac{1}{C_{P2}} + \frac{1}{C_A}} \qquad \text{Eq. 2}$$

where $C_T'$ is the capacitance of the clamping circuit 18 between electrical line 4, 6 and ground, $C_{P1}$ is the capacitance of a first parallel arrangement of diodes, $C_{P2}$ is the capacitance of a second parallel arrangement of diodes, and $C_A$ is the capacitance of the avalanche semiconductor 40, 50.

In operation, the circuit in FIG. 11 will perform the same as the circuit in FIG. 10, except that the level of capacitance from line-to-ground and line-to-line will be reduced from the capacitance of the circuit in FIG. 10 in accordance with Equation 2 above.

Figure 15:
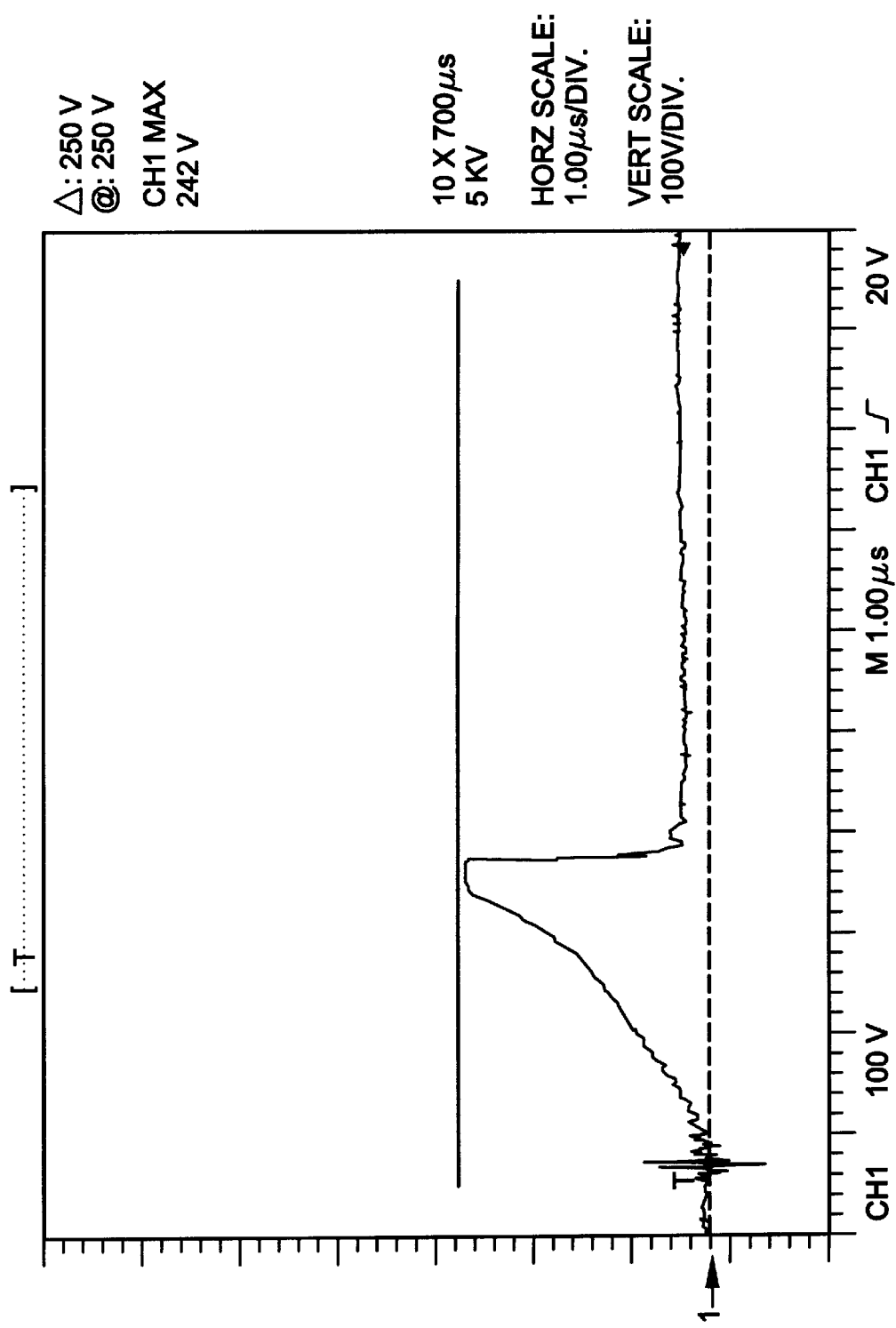
FIG. 15 is a graph of voltage versus time illustrating the voltage across the gas tube in FIG. 11 after a 10/700 pulse is introduced onto either electrical line.
Figure 16:
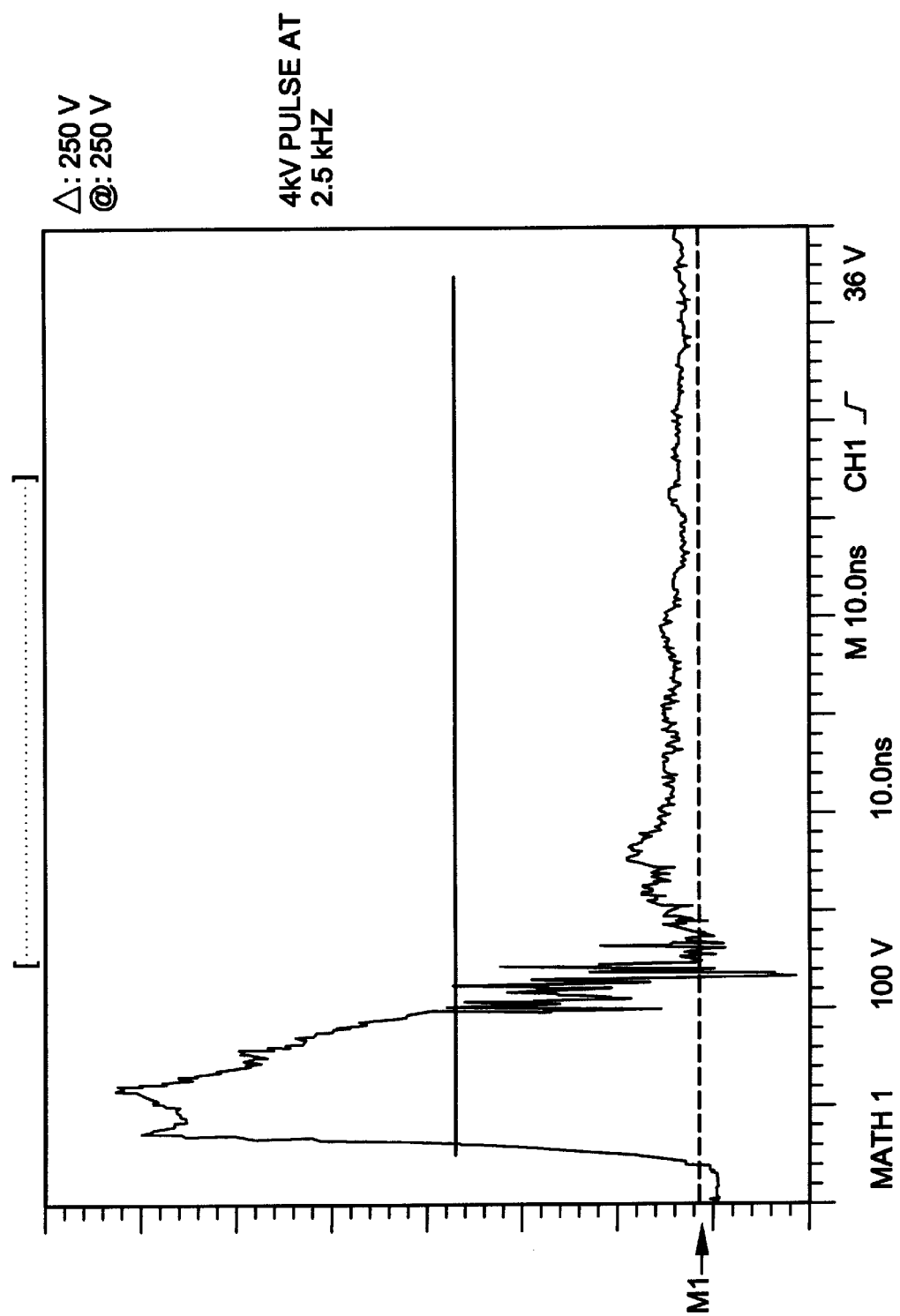
FIG. 16 is a graph of voltage versus time illustrating the voltage across the gas tube in FIG. 11 after a 5/50 pulse is introduced onto either electrical line.

Referring now to FIGS. 15 and 16, the operation of the circuit in FIG. 11 will be described in greater detail. FIG. 15 depicts a graph of voltage from one electrical line 4, 6 to ground versus time after a 10/700 pulse is introduced to one electrical line 4, 6 of the circuit in FIG. 11. As the pulse ramps up, the voltage across the gas tube increases. As a result, the gas tube begins to charge. When the voltage across the gas tube reaches the breakdown voltage of the avalanche semiconductor plus the turn on voltage of the two diodes (the forward biased diodes of the series connected parallel arrangement of diodes), the avalanche semiconductor sinks current and clamps the voltage across the gas tube at the avalanche semiconductor's breakdown voltage and the forward voltage drops of the two diodes mentioned above.

In FIG. 15, the avalanche semiconductor begins sinking current when the voltage across the gas tube reaches 242V. The 242V level is reached 2.4 µs after the 10/700 pulse is introduced to the electrical line.

FIG. 16 is a graph of voltage from one electrical line 4, 6 to ground versus time after a 5/50 pulse is introduced to one electrical line 4, 6 of the circuit in FIG. 11. The circuit operates in the same manner as when the 10/700 pulse is introduced. The faster pulse, however, is shown to cause a voltage spike of 625V before the diodes turn on and the avalanche semiconductor begins sinking current. Once the avalanche semiconductor begins sinking current, the voltage drops below 280V. Within 20 ns of the beginning of the pulse, the voltage is below 280V. Within 26 ns, the voltage is below 100V.

Using the same preferred components as described with respect to the embodiment shown in FIG. 9, the surge protector with the additional parallel arrangement of fast recovery diodes in an opposite polarity configuration exhibits a line-to-ground capacitance of about 25 pF, and a line-to-line capacitance of between about 11 pF and about 13 pF.

Figure 12:
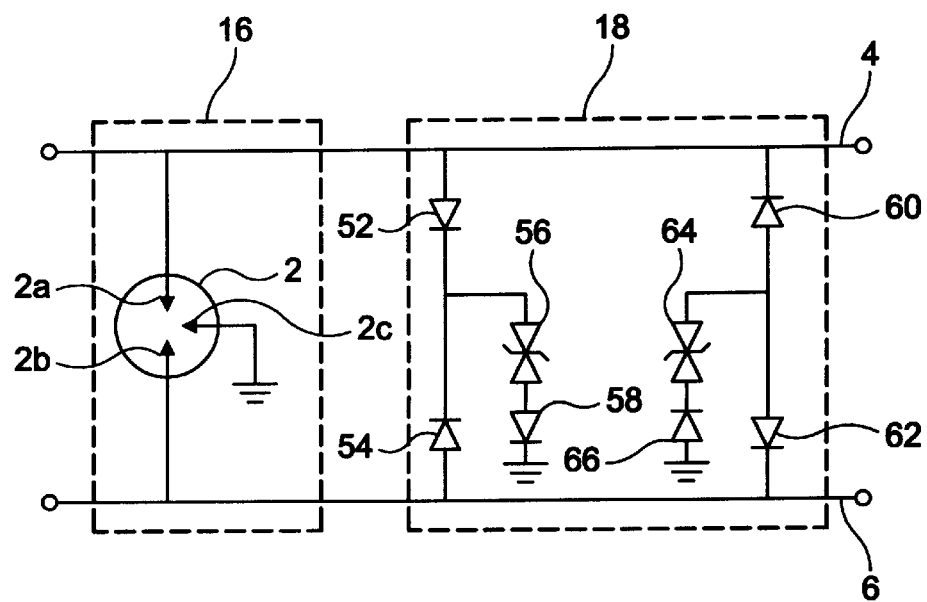
FIG. 12 is a schematic diagram of a fourth embodiment of a surge protector formed in accordance with the present invention.

The circuits shown in FIGS. 9, 10, and 11 are unbalanced and, therefore, the capacitances between the electrical lines 4, 6 and between either line and ground will be different. A balanced configuration for a surge protector is envisioned, however, having substantially the same relatively low capacitance between the electrical lines and between either line and ground. This balanced configuration is shown in FIG. 12. The capacitance seen from either electrical line 4, 6 or ground will be within 5 pF of one another.

Telephone and RS-422 lines are called balanced lines because the signal is placed between two lines, which are floating with respect to ground. The balanced line has the advantage of providing improved noise immunity over unbalanced lines that use ground as a signal reference and are thus vulnerable to noise and transients. By configuring the fast recovery diodes 52, 54, 60, 62 in a bridge arrangement, the surge protection module is placed in a balanced state for protection against both positive and negative transients. Moreover, the avalanche semiconductor need only be unidirectional. The fast recovery diodes are chosen to have a low capacitance to reduce loading on the line and high-speed turn-on characteristics for a fast transient response.

Further, since transients are usually common-mode, it is important that the circuit operate in a balanced mode; otherwise, common mode transients can cause differential mode disturbances that can damage line receivers.

The specific embodiment of the balanced surge protector of the present invention is illustrated in the schematic diagram of FIG. 12. The gas dissipating tube 2 includes a first electrode 2a connected to one electrical line 4, 6 and a second electrode 2b connected to the other electrical line 4, 6. The gas tube 2 is included as part of dissipating means 16. The third electrode 2c is connected to ground. Forming part of clamping circuit 18, a first pair of low capacitance, fast recovery diodes 52 and 54 are connected cathode-to-cathode with their respective anodes connected to electrical lines 4, 6. A first avalanche semiconductor 56 is connected in series with another low capacitance, fast recovery diode 58, whose cathode is connected to ground, and whose anode is connected to the first avalanche semiconductor 56. The other end of avalanche semiconductor 56 is connected to the juncture of diodes 52, 54. Alternatively, the positions of the avalanche semiconductor 56 and diode 58 may be switched (i.e., the interconnected cathodes of diodes 52, 54 are coupled to the anode of diode 58, whose cathode is connected to one end of the avalanche semiconductor 56, whose other end is connected to ground).

A similar arrangement of diodes and an avalanche device is included as another part of clamping circuit 18. A second pair of low capacitance, fast recovery diodes 60 and 62 are connected anode-to-anode with their respective cathodes connected to electrical lines 4, 6. A second avalanche semiconductor 64 is connected in series with another low capacitance, fast recovery diode 66, whose anode is connected to ground and whose cathode is connected to the second avalanche semiconductor 64. The other end of avalanche semiconductor 64 is connected to the juncture of diodes 60, 62. Alternatively, the positions of the avalanche semiconductor 64 and diode 66 may be switched (i.e., the interconnected cathodes of diodes 60, 62 are coupled to the anode of diode 66, whose cathode is connected to one end of the avalanche semiconductor 64, whose other end is connected to ground).

The surge protector suppresses energy on electrical line 4, 6 in the following manner. An energy surge occurs on electrical line 4 or 6. A positive voltage transient on line 4 will turn on diodes 52 and 58 and be clamped by avalanche semiconductor 56. A positive voltage transient on line 6 will turn on diodes 54 and 58 and also be clamped by avalanche semiconductor 56. A negative voltage transient on line 4 (i.e., ground will be more positive than line 4) will turn on diodes 60 and 66 and will be clamped by avalanche semiconductor 64. A negative voltage transient on line 6 (i.e., ground will be more positive than line 6) will turn on diodes 62 and 66 and also be clamped by avalanche semiconductor 64. The avalanche semiconductors 56, 64 are selected to react almost instantaneously to a transient pulse and to have a breakdown voltage which will clamp the transient pulse at a voltage level which is safe for the electronic equipment connected to electrical lines 4, 6. The slower gas tube 2 will then have time to react to the pulse and discharge the transient before the elements of the clamping circuit 18 or electrical equipment 14 are damaged. With the same fast recovery diodes and avalanche semiconductor used in the preferred circuit of FIG. 9, the circuit of FIG. 12 has a relatively low (and substantially equal) line-to-ground and line-to-line capacitance of between about 18 pF and about 20 pF.

Figure 17:
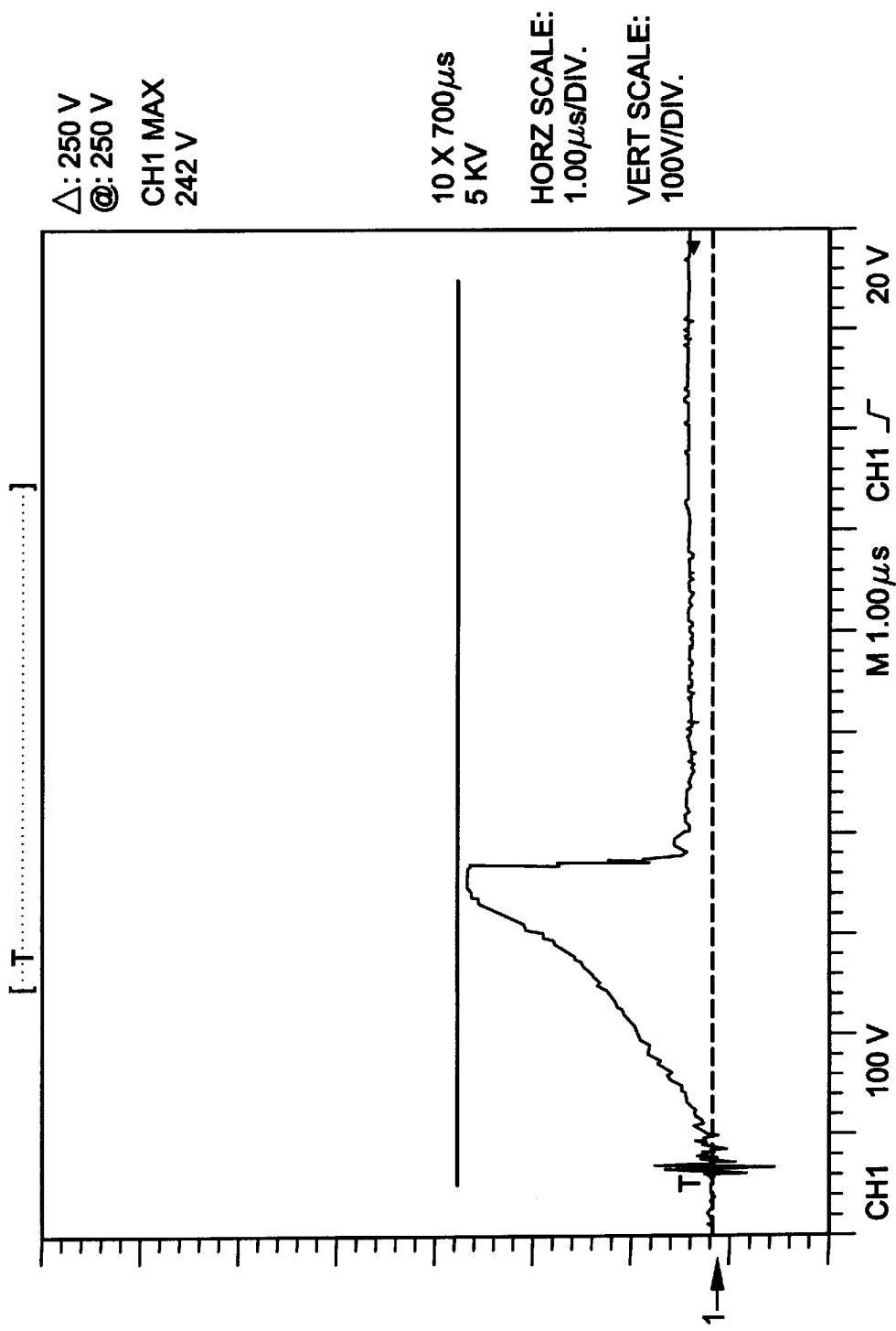
FIG. 17 is a graph of voltage versus time illustrating the voltage across the gas tube in FIG. 12 after a 10/700 pulse is introduced onto either electrical line.

FIG. 17 illustrates a graph of voltage from one electrical line 4, 6 to ground versus time after a 10/700 pulse is introduced to one electrical line 4, 6 of the circuit in FIG. 12. As the pulse ramps up, the voltage across the gas tube increases. As a result, the gas tube begins to charge. When the voltage across the gas tube reaches the breakdown voltage of the avalanche semiconductor plus the turn on voltage of two diodes (the forward biased diodes of the series connected parallel arrangement of diodes), the avalanche semiconductor sinks current and clamps the voltage across the gas tube at the sum of the avalanche semiconductor's breakdown voltage and the forward voltage drops of the two diodes mentioned above.

In FIG. 17, the avalanche semiconductor begins sinking current when the voltage across the gas tube reaches 242V. The 242V level is reached 2.2 $\mu$s after the 10/700 pulse is introduced to the electrical line.

Figure 18:
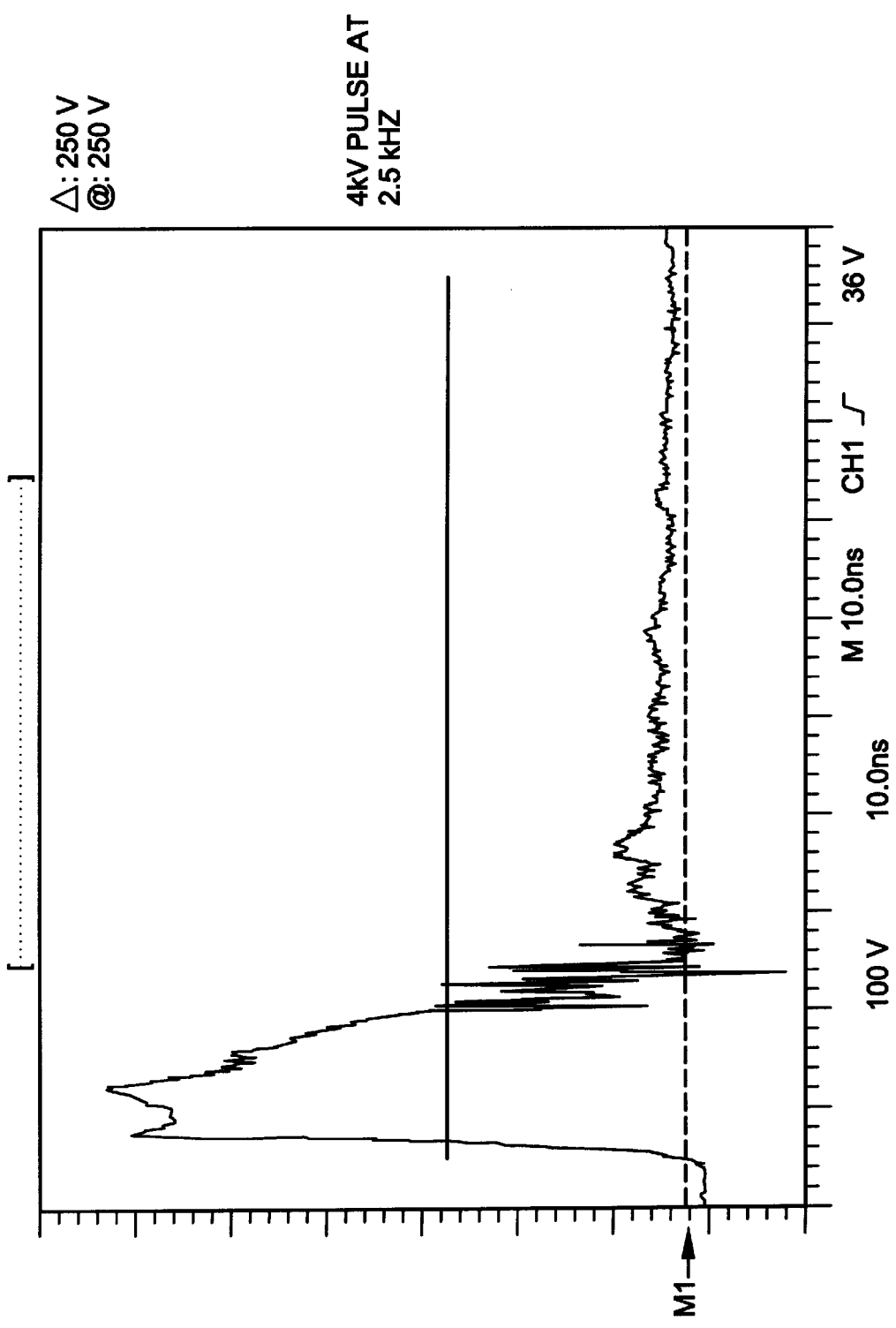
FIG. 18 is a graph of voltage versus time illustrating the voltage across the gas tube in FIG. 12 after a 5/50 pulse is introduced onto either electrical line.

FIG. 18 is a graph of voltage from one electrical line 4, 6 to ground versus time after a 5/50 pulse is introduced to one electrical line 4, 6 of the circuit in FIG. 12. The circuit operates in the same manner as when the 10/700 pulse is introduced. The faster pulse, however, is shown to cause a voltage spike of 625V before the diodes turn on and the avalanche semiconductor begins sinking current. Once the avalanche semiconductor begins sinking current, the voltage drops below 280V. Within 20 ns of the beginning of the pulse, the voltage is below 280V. Within 26 ns of the begining of the pulse, the voltage is below 100V.

Figure 19:
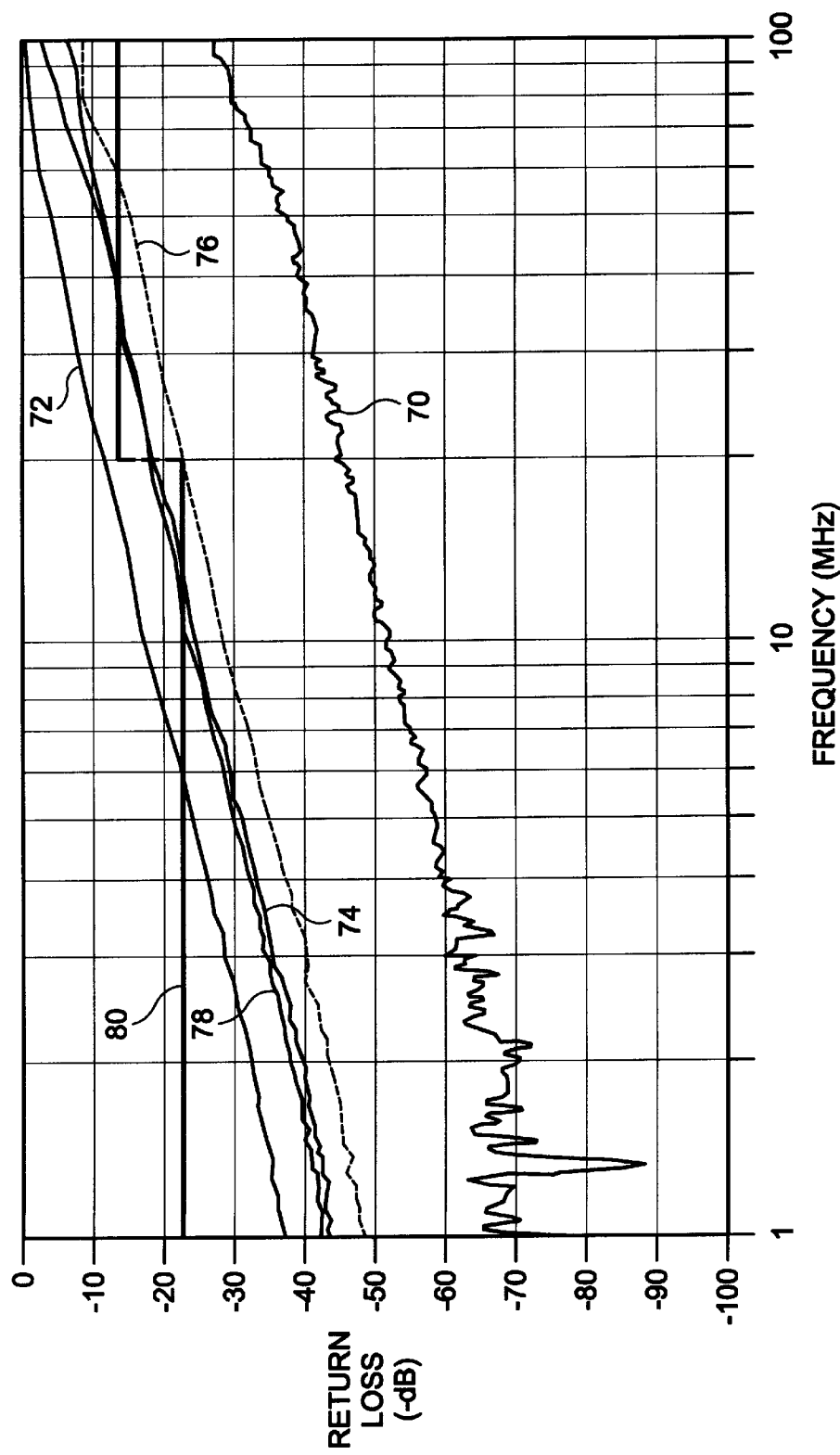
FIG. 19 is a graph of signal loss in dB versus frequency illustrating the signal loss after installing the surge protector circuit.

Referring to FIG. 19, a return loss signal is illustrated for signal frequencies ranging from 1 MHz to 100 MHz. The return loss is the amount of power in dB which is reflected from the load (i.e., the electronic equipment 14 and the surge protection circuit 12) when the load is mismatched to a power source. FIG. 19 illustrates return losses for a single gas tube surge protector and the first, second, third, and fourth embodiments of the present invention.

Figure 1:
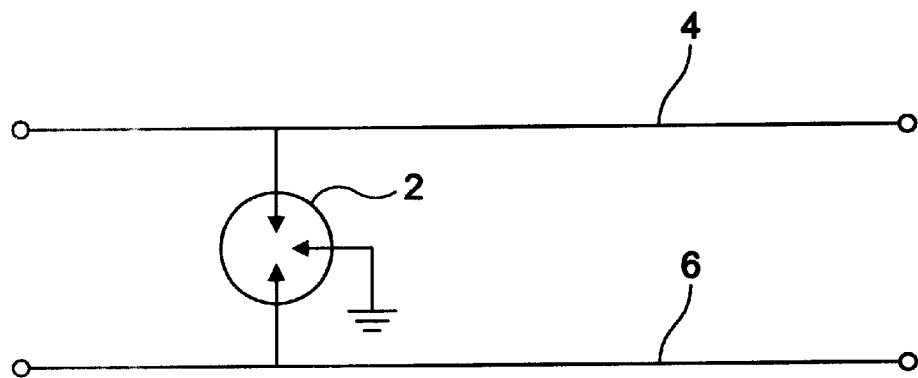
FIG. 1 is a schematic diagram of a prior art surge protector circuit which consists of a gas tube.
Figure 2:
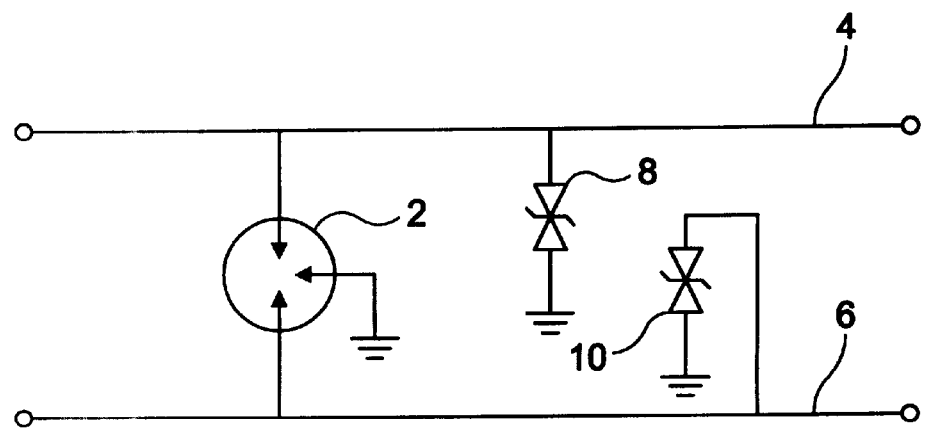
FIG. 2 is a schematic diagram of a prior art surge protector which consists of a combination of a gas tube and an avalanche semiconductor.
Figure 3:
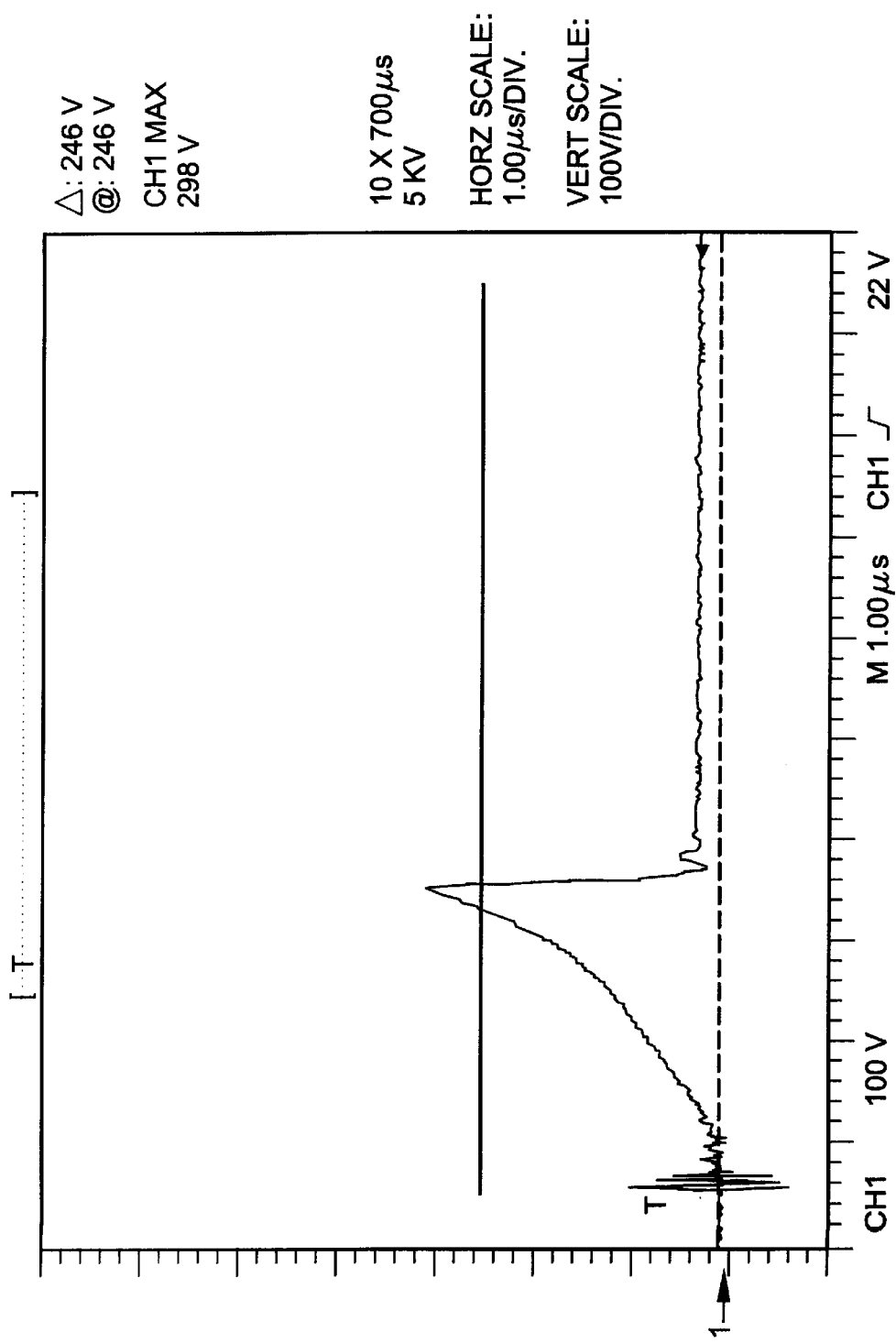
FIG. 3 is a graph of voltage versus time illustrating the voltage across the gas dissipating tube in the circuit of FIG. 1 after a 10/700 pulse is introduced onto either electrical line.
Figure 4:
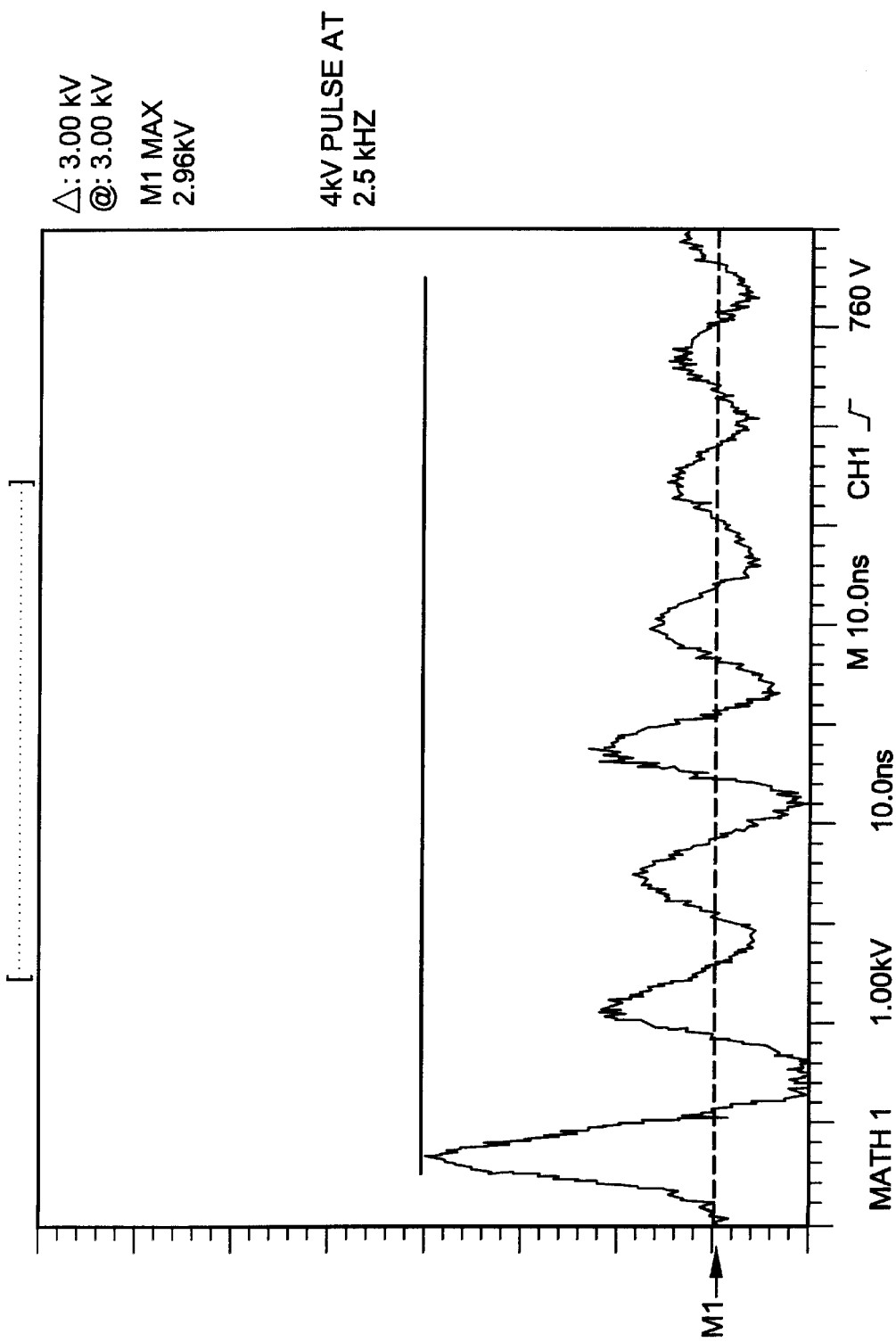
FIG. 4 is a graph of voltage versus time illustrating the voltage across the gas dissipating tube in the circuit of FIG. 1 after a 5/50 pulse is introduced onto either electrical line.
Figure 5:
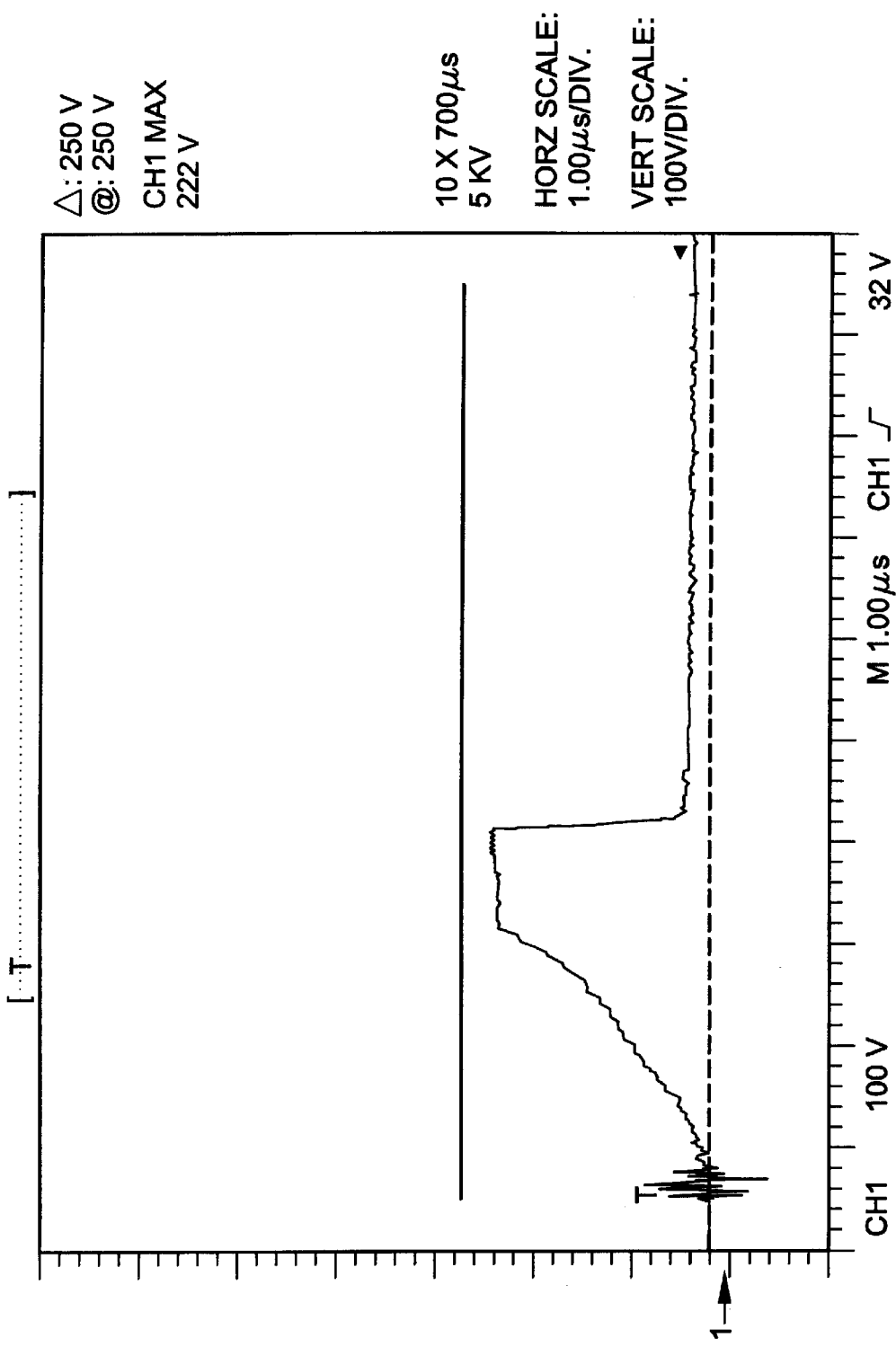
FIG. 5 is a graph of voltage versus time illustrating the voltage across the gas dissipating tube in the circuit of FIG. 2 after a 10/700 pulse is introduced onto either electrical line.

The return loss signal for the surge protector illustrated in FIG. 1 is illustrated in FIG. 19 by line 70. The return loss signal for the surge protector in FIG. 2 is illustrated by line 72. The return loss signals for the surge protector in FIGS. 10, 11, and 12 are illustrated by lines 74, 76, and 78, respectively. A solid line 80 illustrates the EIA/TIA 586 Category 5 Limits. The EIA/TIA is a committee which sets standards for electronic equipment. FIG. 19 illustrates the frequency performance for each of the embodiments of the surge protectors of the present invention. As can be seen from FIG. 19, the circuits of the present invention previously described meet EIA/TIA's requirements for all frequencies in which the return loss signal is below line 80. The approximate frequencies at which each embodiment satisfies the EIA/TIA requirements are shown in the chart below:

| Figure Number Corresponding To Tested Circuit | Approximate Frequencies |
| --- | --- |
| 1 | 1 MHz–100 MHz |
| 2 | 1 MHz–5.2 MHz |
| 10 | 1 MHz–13 MHz, 20 MHz–35 MHz |
| 11 | 1 MHz–60 MHz |
| 12 | 1 MHz–10 MHz, 20 MHz–35 MHz |

The chart above is not a limitation of the embodiments of the present invention. It merely illustrates the wide range of frequencies at which the embodiments perform exceptionally well. The return loss signals of FIG. 19 were obtained using the same preferred components as described with respect to the embodiment shown in FIG. 9. As the components change, the frequencies at which the EIA/TIA requirements are satisfied may change.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A low capacitance surge protector comprising:
   a gas tube having a first element and a ground element, the first element connected to a first conductor, the ground element connected to ground;
   a first avalanche semiconductor; and
   at least a first parallel arrangement of diodes connected in series with the first avalanche semiconductor forming a first series arrangement of components, the first series arrangement of components connected between the first conductor and ground, the at least first parallel arrangement of diodes including at least one pair of diodes, the diodes of the at least one pair of diodes being coupled together in opposite polarity.

2. A low capacitance surge protector as defined by claim 1, further comprising:
   a second element having one end connected to the gas tube and another end connected to a second conductor;
   a second avalanche semiconductor; and
   at least a second parallel arrangement of diodes connected in series with the second avalanche semiconductor forming a second series arrangement of components, the second series arrangement of components connected between the second conductor and ground, the at least second parallel arrangement of diodes including at least one set of two diodes, the diodes of the at least one set of two diodes being coupled together in opposite polarity.

3. A low capacitance surge protector as defined by claim 1, wherein the first series arrangement of components further includes an additional parallel arrangement of diodes connected in series with the first parallel arrangement of diodes and the first avalanche semiconductor, the additional parallel arrangement of diodes including a pair of diodes, the diodes of the pair of diodes being coupled together in opposite polarity.

4. A low capacitance balanced surge protector comprising:
   a gas tube having a first element, a second element, and a ground element, the first element connected to a first conductor, the second element connected to a second conductor, and the ground element connected to ground;
   a first series arrangement of diodes connected between a first conductor and second conductor, the first series arrangement of diodes including two diodes, the two diodes being interconnected cathode to cathode;
   a second series arrangement of diodes connected between a first conductor and second conductor, the second series arrangement of diodes including two diodes, the two diodes being interconnected anode to anode;
   a first avalanche semiconductor and at least one diode connected in series to the first avalanche semiconductor, the first avalanche semiconductor and at least one diode defining a first series arrangement of components, the first series arrangement of components connected to the interconnected cathodes of the diodes in the first series arrangement of diodes;
   a second avalanche semiconductor and at least one diode connected in series to the second avalanche semiconductor, the second avalanche semiconductor and at least one diode defining a second series arrangement of components, the second series arrangement of components connected to the interconnected anodes of the diodes in the second series arrangement of diodes.

5. A low capacitance balanced surge protector as defined in claim 4, wherein the anode of the at least one diode in the first series arrangement of components is connected to the first avalanche semiconductor, the cathode of the at least one diode in the first series arrangement of components is connected to ground, the cathode of the at least one diode in the second series arrangement of components is connected to the second avalanche semiconductor, and the anode of the at least one diode in the second series arrangement of components is connected to ground.

6. A low capacitance balanced surge protector as defined in claim 4, wherein the anode of the at least one diode in the second series arrangement of components is connected to the second avalanche semiconductor, the cathode of the at least one diode in the second series arrangement of components is connected to the interconnected anodes of the second series arrangement of diodes, the cathode of the at least one diode in the first series arrangement of components is connected to the first avalanche semiconductor, and the anode of the at least one diode in the first series arrangement of components is connected to the interconnected cathodes of the first series arrangement of diodes.

7. A method of reducing the capacitance of a surge protector, the surge protector having a gas discharge tube and an avalanche semiconductor coupled in parallel with the gas discharge tube, the gas discharge tube and avalanche semiconductor being electrically coupled between an electrical line and ground, which comprises the step of:

electrically connecting in series with the avalanche semiconductor at least one parallel arrangement of at least one pair of diodes, a first diode of the at least one pair of diodes being coupled in opposite polarity to a second diode of the at least one pair of diodes, the at least one pair of diodes of the parallel arrangement having a total capacitance associated therewith, the avalanche semiconductor having a capacitance associated therewith, the total capacitance of the parallel arrangement and capacitance of the avalanche semiconductor combining in series, thereby reducing the capacitance of the surge protector between the electrical line and ground.

8. A method of reducing the capacitance of a surge protector as defined in claim 7, wherein each diode of the at least one pair of diodes is a fast recovery diode.

9. A method of reducing the capacitance of a surge protector the surge protector having a three element gas tube, a first avalanche semiconductor, and a second avalanche semiconductor, the three element gas tube having a first element electrically coupled to a first conductor, a second element electrically coupled to a second conductor, and a ground element electrically coupled to ground, the first avalanche semiconductor being electrically coupled between the first conductor and ground, and the second avalanche semiconductor being electrically coupled between the second conductor and ground, which comprises the step of:

electrically connecting in series with the first avalanche semiconductor at least one parallel arrangement of at least one pair of diodes, a first diode of the at least one pair of diodes being coupled in opposite polarity to a second diode of the at least one pair of diodes, the at least one pair of diodes of the parallel arrangement having a total capacitance associated therewith, the first avalanche semiconductor having a capacitance associated therewith, the total capacitance of the parallel arrangement and capacitance of the first avalanche semiconductor combining in series, thereby reducing the capacitance of the surge protector between the first conductor and ground;

electrically connecting in series with the second avalanche semiconductor at least one parallel arrangement of least one set of diodes, a first diode of the at least one set of diodes being coupled in opposite polarity to a second diode of the at least one set of diodes, the at least one set of diodes of the parallel arrangement having a total capacitance associated therewith, the second avalanche semiconductor having a capacitance associated therewith, the total capacitance of the parallel arrangement and capacitance of the second avalanche semiconductor combining in series, thereby reducing the capacitance of the surge protector between the second electrical line and ground.

10. A method of reducing the capacitance of a surge protector as defined in claim 9, wherein each diode is a fast recovery diode.

11. A method of reducing the capacitance of a surge protector, the surge protector having a gas tube and an avalanche semiconductor coupled in parallel with the gas tube, the gas tube and avalanche semiconductor being electrically coupled between an electrical line and ground, which comprises the step of:

electrically connecting in series with the avalanche semiconductor at least one parallel arrangement of at least one pair of diodes, the one diode of the at least one pair of diodes being coupled in opposite polarity to the other diode of the at least one pair of diodes, the at least one pair of diodes of the parallel arrangement having a total capacitance associated therewith, the avalanche semiconductor having a capacitance associated therewith, the total capacitance of the parallel arrangement and capacitance of the avalanche semiconductor combining in series, the resulting total capacitance being calculated by $$C_T' = \frac{1}{\frac{1}{C_P} + \frac{1}{C_A}}$$

where $C_T'$ is the capacitance between the electrical line and ground, $C_P$ is the capacitance the parallel arrangement, and $C_A$ is the capacitance of the avalanche semiconductor, thereby reducing the capacitance of the surge protector between the electrical line and ground.

* * * * *